United States Patent [19]

Middleton

[11] Patent Number: 4,833,870
[45] Date of Patent: May 30, 1989

[54] BRAKING MECHANISM FOR A FRUIT HARVESTING APPARATUS

[76] Inventor: David J. Middleton, 1304 N. Butler St., Farmington, N. Mex. 87401

[21] Appl. No.: 120,154

[22] Filed: Nov. 13, 1987

Related U.S. Application Data

[63] Continuation-in-part of Ser. No. 901,070, Aug. 26, 1986, abandoned.

[51] Int. Cl.$^4$ .............................................. A01D 46/24
[52] U.S. Cl. ........................................ 56/340; 56/332
[58] Field of Search ................ 56/332, 333, 334, 335, 56/336, 340, 339; 193/7, 15, 27, 28, 32; 182/48

[56] References Cited

U.S. PATENT DOCUMENTS

| 233,771 | 10/1880 | Kent | 56/334 |
|---|---|---|---|
| 1,300,168 | 4/1919 | Hoeber | 56/332 |
| 1,482,346 | 1/1924 | Burgess | 56/334 |
| 1,588,034 | 6/1926 | Kochler | 56/339 |
| 2,711,625 | 6/1955 | Bullock | 56/332 |

FOREIGN PATENT DOCUMENTS

| 317513 | 4/1918 | Fed. Rep. of Germany | 56/339 |
|---|---|---|---|
| 1144024 | 10/1957 | France | 56/334 |
| 304906 | 4/1971 | U.S.S.R. | 56/332 |
| 982579 | 12/1982 | U.S.S.R. | 56/328.1 |
| 2150537 | 7/1985 | United Kingdom | 56/340 |

*Primary Examiner*—John Weiss
*Attorney, Agent, or Firm*—David J. Middleton

[57] ABSTRACT

This invention involves a fruit harvesting apparatus (10) comprising an extensible handle unit (11) a body attached support unit (12), a fruit picking unit (13) a chute unit (14) wherein improvement comprise an adjustable brake unit (15) which is operatively associated with the chute unit (14) relative to the gravity feed of the fruit (102) therethrough.

8 Claims, 2 Drawing Sheets

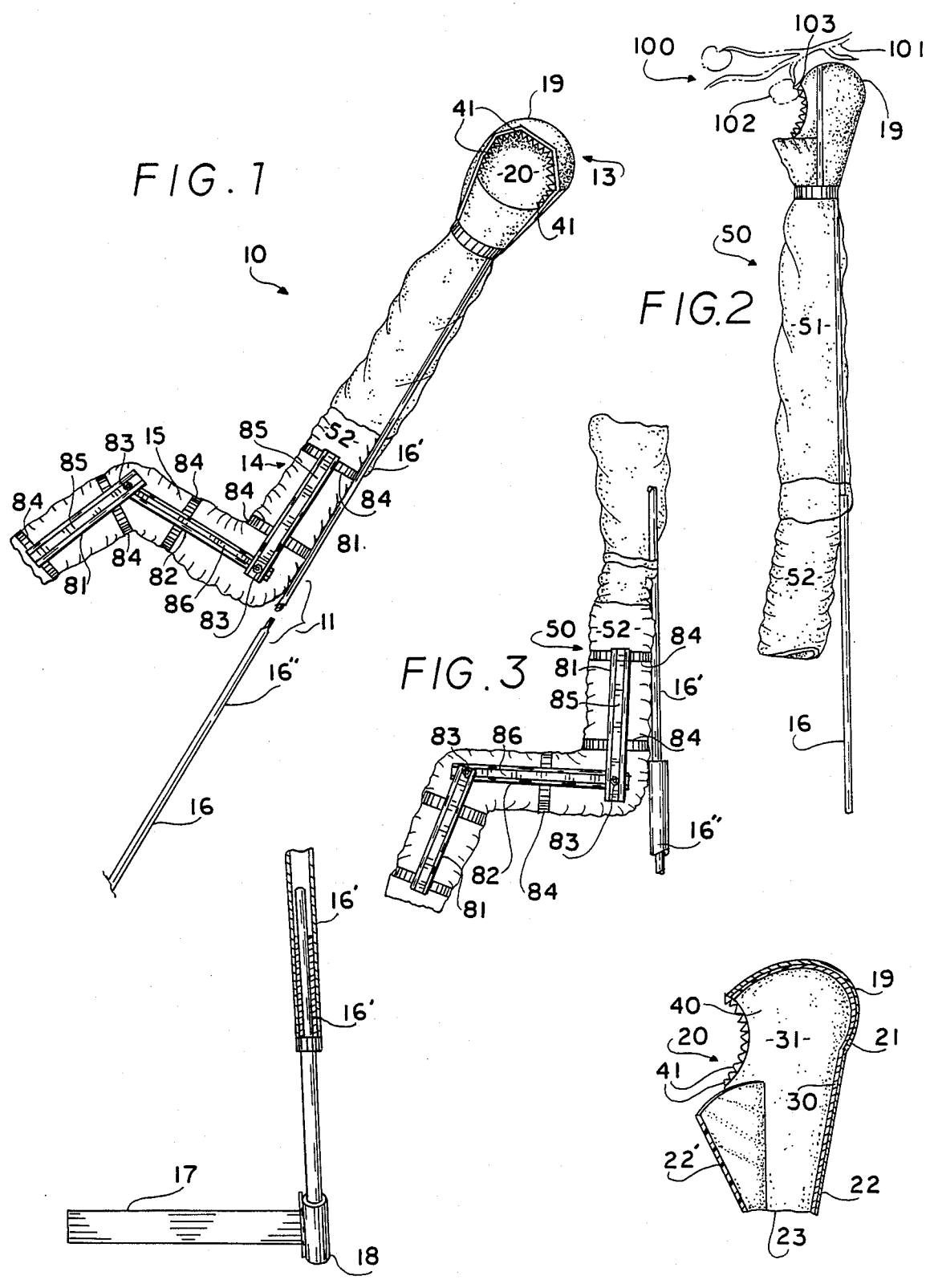

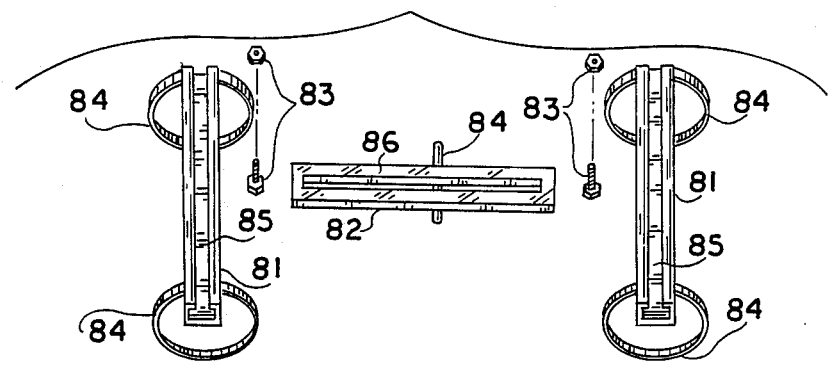
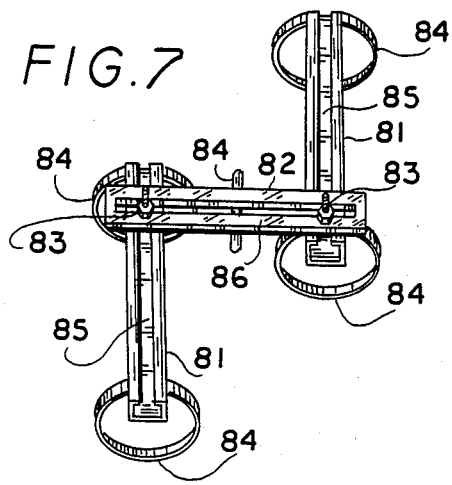
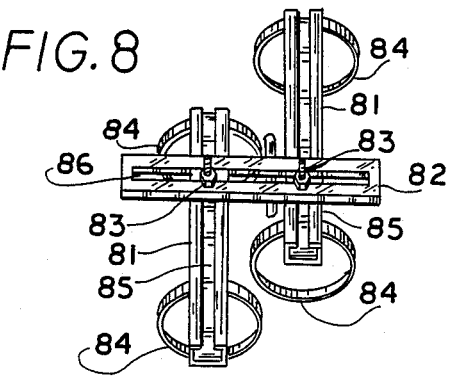
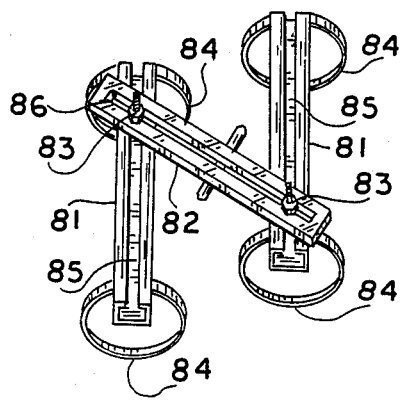
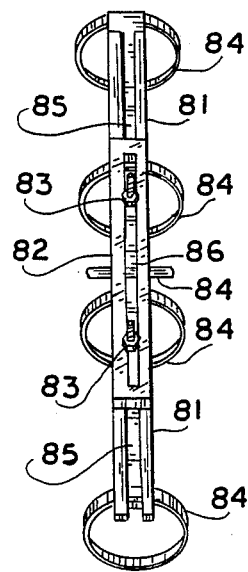

BRAKING MECHANISM FOR A FRUIT HARVESTING APPARATUS

This is a continuation-in-part-application of my co-pending patent application Ser. No. 06/901,070 filed Aug. 26, 1986 abandon Mar. 16, 1988 and entitled IMPROVED FRUIT HARVESTING APPARATUS.

TECHNICAL FIELD

The present invention relates generally to long handled fruit harvesting implements having a transport chute affixed thereto.

BACKGROUND OF THE INVENTION

The prior art is replete with fruit pickers having a chute for conveying the fruit from the tree or bush to a collection receptacle.

Examples of these prior art constructions may be seen by reference to the following U.S. Pat. Nos: 1,064,881; 1,767,977; 1,881,134; and 3,855,765. While all of these prior art constructions are more than adequate for there intendedpurpose and function; they do suffer from both shared and individual deficiencies.

To begin with, all of the prior art constructions employ opaque chute elements that act as visual obstructions to the person using the fruit picker, so that in many instances during the fruit picking process the picker is picking 'blind'.

In addition, the majority of prior art fruit pickers employ a forked picking element to dislodge the fruit from the branches, and the tines of the fork not only have the potential for penetrating the skin of the fruit; but, also have an uncanny tendency to become entangled in the branches of a fruit tree.

Furthermore, while some of the prior art constructions employ a fruit braking mechanism, these braking mechanisms are normally specifically dimensioned to accommodate fruit of a limited size range; and, there are no provisions for varying the braking force of the various braking mechanisms employed Obviously there existed a pressing need to develop an improved fruit picking construction that provides solutions to the problems of the prior art constructions enumerated above.

BRIEF SUMMARY OF THE INVENTION

The improved fruit picking construction that forms the basis of this invention comprises in general an extensible handle unit that is operatively associated with a support unit on one end; and, a new and improved fruit picking implement on the other end.

In addition, the improved fruit picking construction also comprises an improved chute element; wherein, the upper portion of the chute is transparent to permit the operator to visually observe the picking of the fruit; and, the lower portion of the chute is providedwith an adjustable braking mechanism, wherein the frictional resistance and the natural forces can be varied to accommodate fruit having a wide range of sizes.

BRIEF DESCRIPTION OF THE DRAWING

These and other objects, advantages, and novel features of the invention will become apparent from the detailed description of the best mode for carrying out the preferred embodiment of this invention which follows, particularly when considered in conjunction with the accompanying drawings; wherein:

FIG. 1 is a perspective view of the improved construction;

FIG. 2 is a side view of the upper portion of the improved construction;

FIG. 3 is a view of the braking system on the lower section of the corrugated chute segmint.

FIG. 4 is an enlarged detail view of the support unit of the improved construction;

FIG. 5 is an enlarged cross-sectional view of the picking unit;

FIG. 6 is a detailed exploded view of the braking parts.

FIG. 7 is a detailed expanded lateral view of the braking system off of the lower corrugated chute segment.

FIG. 8 is a view of the compressed lateral position of the brake system off the corrugated chute segment.

FIG. 9 is a detailed view of the inclined lateral position of the brake system off of the corrugated chute segment.

FIG. 10 is an axially compressed view of the braking system off the corrugated chute segment.

BEST MODE FOR CARRYING OUT THE INVENTION

As can be seen by reference to the drawings and in particular to FIG. 1, the fruit harvesting apparatus that comprises the basis of the present invention is designated generally by the reference number (10). The fruit harvesting apparatus (10) comprises in general; an extensible handle unit (11); a body attached support unit (12); a fruit picking unit (13); a chute unit (14) attached to both the handle unit (11) and the fruit picking unit (13); and an adjustable braking unit (15) operatively associated with the chute unit (14). These units will now be described in seriatim fashion.

As shown in FIG. 1, the extensible handle unit (11) comprises a typical locking telescopeing handle member (16); wherein, the upper portion (16') of the handle member is reciprocable with the lower portion (16"), and a locking means (not shown) are provided to temporarily secure the upper (16') and lower (16") portions at a desired location relative to one another.

As can best be seen by reference to FIGS. 1 and 4, the body attached support unit (12) comprises a torso engaging belt member (17) having a receptacle element (18) operatively attached thereto; wherein, the receptacle element (18) is dimensioned to receive and support the lower end (16") of the telescoping handle member (16). This arrangement allows the users torso to bear the weight of the apparatus (10); while the users arms are left free to manipulate the apparatus (10) between the limbs (101) of a fruit tree (100) to effect the harvesting of the fruit (102).

As shown in FIGS. 1, 2, and 5, the fruit picking unit (13) of this invention comprises a generally inverted pear shaped, hollow fruit picking member (19), having an enlarged opening (20) formed therein; which occupies at least one of the upper quadrants of the larger end of the generally pear-shaped fruit picking member (19).

As can best be seen by reference to FIG. 5, the upper rear quadrant of the fruit picking member (19) defines the severing and scooping element (21) of the fruit picking member (19); and, the lower quadrants define a tapered funnel element (22); wherein, the front (22') of the funnel element (22) is Fabricated from transparent material, for the reasons that will be explained shortly.

In addition, the interior of the upper and lower rear quadrants of the fruit picking member (19) are provided with cushioning means (30) in the form of a resilient covering (31); whose purpose and function is to prevent the bruising of the skin of the fruit, as the fruit first drops into and makes contact with the interior of the fruit picking member (19). The cushioning means (30) not only prevents bruising; but, will also act to slow the gravity feed of the fruit (102) into the funnel element outlet (23).

As can be seen in particular by reference to FIGS. 1 and 5, the periphery of the upper rear quadrent of the fruit picking member (19) is provided with severing means (40) in the form of a plurality of serrated teeth (41). In addition, the deformable cushioning means (30) is disposed in an overlapping relationship with the severing means (40); whereby the cutting surfaces of the serrated teeth (41) are effectively sheathed from contact with the fruit (102) or the fruit stem (103), prior to the retraction of the resilient covering (31).

As can be seen in FIGS. 1 and 2, the chute unit (14) is operatively connected to the outlet of the fruit harvesting unit (13) and comprises an enlongated flexible tubular chute member (50) having a transparent upper chute segment (51) and a corrugated lower chute segment (52).

The transparent upper chute segment (51) is intended to cooperate with the transparent face (22") of the funnel element (22) of the fruit harvesting unit (13); whereby, the user on the ground will have an unobstructed view of the position of the severing means (40) with respect to the elevated location of the fruit (102) The adjustable braking unit (15) is depicted in FIGS. 1,3,6,7,8,9, and 10, and comprise a braking member (80), which is operatively attached to the corrugated chute segment (52), to selectively deform that portion of the chute unit (14), for the purpose of varying the speed of the gravity feed of the fruit (102) therethrough.

As can best be appreciated by referance to FIG. (6). The brake member (80) comprise two elongated end brake elements (81), that are vertically spaced from one another and fastened to different portions of the corrugated chute segment (52); whereby, the two end brake members (81) are intersected by the intermediate brake element (82); whereby, the brake members are operatively, adjustably, and functionally secured together by means of the releaseable securing means (83).

As can be seen best in FIGS. 6-10, the elongated brake end members (81), comprise of rectangular tubes that are slotted (85) down the length of the end brake members (81) to functionally hold the head of the releaseable securing means (83), inside the rectangular tube (81); whereby, thesaid releaseable securing means (83) head, will functionally slide the length of said slot (85); whereby, the threaded stem of the releasable securing means (83) will protrude through said slot to functionally engage the slot (86) of the intermeadiate brake unit (82); wherein, the intermeadiate brake element (82) consists of an elongated bar that is slotted down the center (86); wherein, said slot receaves the stem of the releaseable securing means (83); whereby the end brake elements (81) and the intermediate brake (82) are frictionally bonded by means of the nut, of the releaseable securing means (83); whereby, the releaseable securing means (83) consists of a standard bolt and nut arrangement; whereby, said releaseable securing means adjustably, operatively, and frictionally maintain the braking force position of the corrugated chute.

In addition, the brake members (81), and (82) are fitted with a band member, that frictionally bond the corrugated chute (52) to the brake elements (81) and (82).

At this juncture it should be appreciated that the vertical disposition of FIG. (10) allows the passage of fruit to gravity feed without any braking action being applied; whereby, when the vertical spacing is shortened by means of the intermediate brake (82), and the releaseable securing means (83) the corrugated chute (52) is compressed, effectively reducing the inside diameter to it's minimum value. Therefore, at least a portion of the chute unit (14) may be radically expanded and contracted to accommodate fruits (102) having different diameters.

As can be seen in FIGS. (7) and, (8), the horizontal disposition of the braking unit (15) sets up a plurality of radically disposed alternating rib members and recesses due to the nature of the corrugated chute (14). Thereby, effectively reducing the gravity feed of the fruit (102) by bounceing the fruit (102) over the barriers. The horizontal disposition of the brake unit (15) is accomplished by means of the intermediate brake (82) and the releaseable securing means (83).

As can best be seen in FIG. (8) the lateral distance of the horizontal disposition of the corrugated chute (52) can be expanded and contracted to effectively increase or decrease the inside diameter of the corrugated chute segment (52) to adjustability increase the frictional resistance to the passage of the fruit (102). This is accomplished by adjustment of the intermediate brake element (82) and the releaseable securing means (83).

In referance to FIG. (9), the horizontal plane may be inclined to use the natural force of gravity to pull the fruit (102) down, once the natural force of the fruit has started up the inclined plane. In this case gravity is one of the forces used to slow the fruit ultimately through the chute outlet (14').

At this juncture it should be appreciated that both the horizontal and vertical disposition of the brake elements (81) relative to one another may be controlled by the selective attachment of the intermediate brake element (82) via the releasable securing means (83). When the horizontal spaceing is shortened, the inside diameter of the chute unit (14) is effectively reduced to it's minimum value since the corrugations of the lower chute segment (52) are compressed together; and, the converse is true as the spacing is increased. Therefore, at least a portion of the chute unit (14) may be radially expanded and contracted to accommodate fruits (102) having different diameters.

In addition, the horizontal inclined plane of the intermediate brake member (82) is obtained, and, maintained by virtue of the common bolt and nut releaseable securing means (83).

In describing the lateral and vertical spacing and the horizontal pitch of the brake unit (15), it should be appreciated that the above stated functions of the brake unit (15) can be used simultaneously, independently, or in any combination.

Having thereby described the subject matter of this invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An improvement in a fruit harvesting apparatus wherein; the fruit harvesting apparatus consists of:
   an extensible handle unit;
   a body attached support unit dimensioned to receive one end of said extensible handle unit;
   a fruit picking unit attached to the other end of said extensible handle unit; wherein, the fruit picking unit comprises a hollow fruit picking member having an enlarged opening forming a fruit inlet and a relatively smaller opening forming a fruit outlet;
   a chute unit operatively attached to the fruit outlet of the fruit picking unit; wherein, said chute unit comprises an elongated flexible tubular chute member having an upper and a lower segment; and, wherein, the improvement comprises:
   an adjustable braking unit operatively associated with the lower segment of said elongated flexible tubular chute member; whereby, the braking unit that is operatively associated with the lower segment of said tubular chute member comprises:
   a braking unit comprising two slotted elongated rectangular tube end braking elements that are vertically spaced from one another and fastened to different portions of the lower segment of the tubular chute member; and, a slotted intermediate adjustable braking element provided with releaseable securing means; whereby, the lateral and vertical spacing, and, the horizontal pitch of the slotted elongated rectangular tube end braking elements may be varied by the selective attachment of the slotted intermediate adjustable braking element to the slotted elongated rectangular tube end braking elements by way of the releaseable securing means, whereby, said lower segment of said tubular chute member may be selectively deformed to provide a tortous path for the passage of fruit through the chute member.

2. The improvement as in claim 1 wherein, said slotted elongated rectangular tube end braking elements comprise:
   slotted elongated rectangular tube end braking elements, that are slotted the length of the tube, to functionally hold the releaseable securing means.

3. The improvement as in claim 1 wherein; said releaseable securing means comprise:
   a cooperating bolt and nut assembly.

4. The improvement as in claim 1, wherein, said slotted elongated rectangular tube end braking elements, and, said slotted intermediate adjustable braking element comprise:
   band members that frictionally bond the braking unit to the lower chute segment.
   slotted elongated rectangular tube end braking elements that are slotted down the center length, securing the releaseable securing means bolt head inside the slotted elongated rectangular tube end braking elements, with the bolt stem of the releaseable securing means protruding through said slot of the slotted elongated rectangular tube end braking elements, to engage the slot of the slotted intermediate adjustable braking element.

5. The improvement as in claim 1 wherein, said slotted intermediate adjustable braking element comprise:
   a elongated bar, slotted down the center, whereas, the slot in the elongated bar receives the bolt stem of the releaseable securing means.

6. The improvement as in claim 5, wherein; said slotted intermediate adjustable braking element intersect the two slotted elongated rectangular tube end braking elements, and is adjustably fastened together by said releaseable securing means.

7. The improvement as in claim 6, whereby; the adjustability of the braking unit is satisfied by the spacing and positioning of the slotted intermediate adjustable braking element, in relation to the slotted elongated rectangular tube end braking elements, by way of said releaseable securing means.

8. The improvement as in claim 7; whereby, the releaseable securing means adjust the slotted intermeadiate adjustable braking element by being slid to the desired position via the slots in the slotted elongated rectangular tube end braking elements and secured in place by the frictional restraint provided by the releaseable securing means.

* * * * *